(12) United States Patent
Medlock et al.

(10) Patent No.: US 12,182,496 B2
(45) Date of Patent: Dec. 31, 2024

(54) FORMATTING MODULE, SYSTEM AND METHOD FOR FORMATTING AN ELECTRONIC CHARACTER SEQUENCE

(71) Applicant: Microsoft Technology Licensing, LLC, Redmond, WA (US)

(72) Inventors: Benjamin Medlock, London (GB); David Martinez Del Corral, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/136,730

(22) Filed: Apr. 19, 2023

(65) Prior Publication Data

US 2023/0252222 A1    Aug. 10, 2023

Related U.S. Application Data

(63) Continuation of application No. 14/428,972, filed as application No. PCT/GB2013/052443 on Sep. 18, 2013, now abandoned.

(30) Foreign Application Priority Data

Sep. 18, 2012    (GB) ..................... 1216640

(51) Int. Cl.
*G06F 16/2455*    (2019.01)
*G06F 40/12*    (2020.01)
(Continued)

(52) U.S. Cl.
CPC ........ *G06F 40/12* (2020.01); *G06F 16/24564* (2019.01); *G06F 40/163* (2020.01); *G06F 40/274* (2020.01); *G06F 40/263* (2020.01)

(58) Field of Classification Search
CPC .. G06F 16/24564; G06F 40/12; G06F 40/163; G06F 40/263; G06F 40/274
See application file for complete search history.

(56) References Cited

U.S. PATENT DOCUMENTS

| | | | |
|---|---|---|---|
| 4,247,906 A | | 1/1981 | Corwin et al. |
| 4,783,803 A | * | 11/1988 | Baker ................ G10L 15/00 704/252 |

(Continued)

FOREIGN PATENT DOCUMENTS

| | | |
|---|---|---|
| CN | 1851642 A | 10/2006 |
| JP | 2006221658 A | 8/2006 |

(Continued)

OTHER PUBLICATIONS

Lex et al., "A Lexical Analyzer Generator", http://mbzz.de/unix/ultrix/etc/lex.pdf, Jul. 21, 1975. (Year: 1975).*

(Continued)

*Primary Examiner* — Matthew J Ellis
(74) *Attorney, Agent, or Firm* — Schwegman Lundberg & Woessner, P.A.

(57) ABSTRACT

There is provided a formatting module configured to format spaces in an electronic character sequence. The formatting module supports at least one language and comprises a language identifier configured to identify whether the electronic character sequence is written in a supported language, and a character identifier configured to identify a particular character or a particular sequence of characters in the electronic character sequence. The formatting module is configured to format spaces in the electronic character sequence on the basis of the language identified and the particular character identified or the particular sequence of (Continued)

characters identified, when a supported language is identified. A system and method for formatting text are also provided.

18 Claims, 2 Drawing Sheets

(51) Int. Cl.
*G06F 40/163* (2020.01)
*G06F 40/274* (2020.01)
*G06F 40/263* (2020.01)

(56) References Cited

U.S. PATENT DOCUMENTS

| | | | |
|---|---|---|---|
| 4,860,378 A | 8/1989 | Aoki et al. | |
| 5,062,143 A * | 10/1991 | Schmitt | G06F 40/289 |
| | | | 382/230 |
| 5,222,225 A | 6/1993 | Groves | |
| 6,374,242 B1 | 4/2002 | Childs et al. | |
| 6,513,002 B1 * | 1/2003 | Gillam | G06F 40/279 |
| | | | 704/E13.011 |
| 6,529,864 B1 * | 3/2003 | Chase | G06F 40/237 |
| | | | 715/236 |
| 6,624,814 B1 | 9/2003 | Karow et al. | |
| 7,080,002 B1 | 7/2006 | Kim et al. | |
| 8,943,405 B1 | 1/2015 | Azose | |
| 2002/0123994 A1 | 9/2002 | Schabes et al. | |
| 2004/0078191 A1 * | 4/2004 | Tian | G06F 40/263 |
| | | | 704/9 |
| 2004/0138881 A1 * | 7/2004 | Divay | G10L 15/22 |
| | | | 704/E15.025 |
| 2006/0184357 A1 | 8/2006 | Ramsey et al. | |
| 2006/0184878 A1 | 8/2006 | Argo et al. | |
| 2006/0294054 A1 | 12/2006 | Kudo et al. | |
| 2008/0147380 A1 * | 6/2008 | Barliga | G06F 40/263 |
| | | | 704/275 |
| 2008/0319735 A1 | 12/2008 | Kambhatla et al. | |
| 2009/0050701 A1 | 2/2009 | Wang et al. | |
| 2009/0254501 A1 | 10/2009 | Song et al. | |
| 2009/0319257 A1 * | 12/2009 | Blume | G06F 40/55 |
| | | | 704/7 |
| 2010/0125447 A1 * | 5/2010 | Goswami | G06F 40/58 |
| | | | 704/8 |
| 2010/0174528 A1 | 7/2010 | Oya et al. | |
| 2011/0295858 A1 | 12/2011 | Ahn et al. | |
| 2012/0262461 A1 * | 10/2012 | Fisher | G06F 40/274 |
| | | | 345/467 |
| 2013/0047078 A1 | 2/2013 | Bever et al. | |
| 2014/0136967 A1 | 5/2014 | White et al. | |
| 2014/0153830 A1 | 6/2014 | Amtrup et al. | |
| 2014/0214406 A1 | 7/2014 | Liu et al. | |
| 2016/0062954 A1 | 3/2016 | Ruff et al. | |

FOREIGN PATENT DOCUMENTS

| | | |
|---|---|---|
| WO | 2010112841 A1 | 10/2010 |
| WO | 2012042217 A1 | 4/2012 |
| WO | 2012098544 A2 | 7/2012 |

OTHER PUBLICATIONS

"Non Breaking Spaces Before Punctuation In French", Retrieved From <<http://goo.gl/MdbMGM>>, Aug. 29, 2012, 7 Pages.
"Office Action Issued in European Patent Application No. 13771173.5", Mailed Date: May 9, 2019, 8 Pages.
"Summons to Attend Oral Proceedings Issued in European Patent Application No. 13771173.5", Mailed Date: Nov. 25, 2019, 11 Pages.
"Final Office Action Issued in U.S. Appl. No. 14/428,972", Mailed Date: Dec. 21, 2022, 26 Pages.
"Final Office Action Issued In U.S. Appl. No. 14/428,972", Mailed Date: May 31, 2018, 21 Pages.
"Final Office Action Issued in U.S. Appl. No. 14/428,972", Mailed Date: Apr. 6, 2021, 23 Pages.
"Final Office Action Issued In U.S. Appl. No. 14/428,972", Mailed Date: Nov. 21, 2019, 26 Pages.
"Final Office Action Issued In U.S. Appl. No. 14/428,972", Mailed Date; Feb. 15, 2019, 23 Pages.
"Non Final Office Action Issued In U.S. Appl. No. 14/428,972", Mailed Date: Jul. 11, 2017, 21 Pages.
"Non Final Office Action Issued in U.S. Appl. No. 14/428,972", Mailed Date: Nov. 19, 2020, 19 Pages.
"Non Final Office Action Issued in U.S. Appl. No. 14/428,972", Mailed Date: Sep. 10, 2018, 21 Pages.
"Non Final Office Action Issued in U.S. Appl. No. 14/428,972", Mailed Date: Jul. 3, 2019, 23 Pages.
"Non Final Office Action Issued in U.S. Appl. No. 14/428,972", Mailed Date: Jul. 15, 2022, 27 Pages.
"First Office Action And Search Report Issued in Chinese Patent Application No. 201380048564.6", Mailed Date: Sep. 5, 2016, 31 Pages.
"Fourth Office Action Issued in Chinese Patent Application No. 201380048564.6", Mailed Date: May 18, 2018, 8 Pages.
"Notice of Allowance Issued in Chinese Patent Application No. 201380048564.6", Mailed Date: Oct. 16, 2018, 4 Pages.
"Second Office Action Issued in Chinese Patent Application No. 201380048564.6", Mailed Date: May 15, 2017, 26 Pages.
"Third Office Action Issued in Chinese Patent Application No. 201380048564.6", Mailed Date: Nov. 10, 2017, 25 Pages.
"Notice of Allowance Issued in Japanese Patent Application No. 2015-531650", Mailed Date: Dec. 11, 2017, 5 Pages.
"Office Action Issued in Japanese Patent Application No. 2015-531650", Mailed Date: Aug. 31, 2017, 7 Pages.
Ehara, et al., "Multilingual Text Entry using Automatic Language Detection", In Proceedings of Third International Joint Conference on Natural Language Processing, Jan. 7, 2008, pp. 441-448.
Zaitsev, et al., "Russian Typographical Traditions in Mathematical Literature", In Proceedings of the EuroTEX Conference, Sep. 20, 1999, 17 Pages.

* cited by examiner

FORMATTING MODULE, SYSTEM AND METHOD FOR FORMATTING AN ELECTRONIC CHARACTER SEQUENCE

This application is a continuation of U.S. application Ser. No. 14/428,972, filed on Mar. 17, 2015, which claims priority to International Application No. PCT/GB2013/052443, filed Sep. 18, 2013, which claims the benefit of priority to Great Britain Patent Application No. 1216640.1, filed Sep. 18, 2012, which applications and publication are incorporated herein by reference in their entireties.

FIELD OF THE INVENTION

The present invention relates to the formatting of spaces in an electronic character sequence. In particular, it relates to a formatting module, system and method for formatting spaces in an electronic character sequence.

BACKGROUND

Punctuation marks are symbols that indicate the structure and organization of written language, as well as intonation and pauses to be observed when reading aloud. The appearance and usage of punctuation marks varies between languages and scripts but in most cases they are vital to disambiguate the meaning of sentences. The use and interpretation of punctuation marks can be heavily context-dependent. For example, a full stop "." can be used as sentence-ending punctuation, an abbreviation indicator, a decimal point, and so on. Punctuation is also present in mathematical and scientific formulae.

Some punctuators appear in pairs and one cannot exist without the other. For example, left parenthesis '(' and right parenthesis ')'. However, in some scenarios a single character is used to represent two punctuators, creating ambiguity, for example in the case of the single quote mark: '.

A space is a blank area, often used to separate words, letters, numbers, and punctuation. Conventions for the formatting of spaces vary among languages. For example, the correct formatting of spaces around a question mark "?" in English is "word?", with no space between the word and the question mark, and a space following the question mark. However, in French the convention is "word ?", where a space is inserted either side of the question mark.

A number of current-market text input systems exhibit some form of space formatting. For example, when a user enters one of the following characters [? ! : ; , .] after entering a space, the Android default keyboard formats spaces either side of the punctuation mark by removing the leading space and adding a trailing space, irrespective of the language in which the text is being entered.

It is an object of the present invention to provide a means for formatting automatically the spaces in an electronic character sequence, such that a user can concentrate on the content of a message without worrying about whether the spaces are correctly formatted in the electronic character sequence. It is also an object of the invention to provide a means for correctly formatting spaces in an electronic character sequence on the basis of the conventions of the language in which the electronic character sequence is written.

SUMMARY OF THE INVENTION

In a first aspect of the present invention, there is provided a formatting module supporting at least one language and configured to format spaces in an electronic character sequence written in a supported language, the formatting module comprising:
  a language identifier configured to identify whether the electronic character sequence is written in a supported language;
  a character identifier configured to identify a particular character or a particular sequence of characters in the electronic character sequence;
  wherein the formatting module is configured to format spaces in the electronic character sequence on the basis of the language identified and the particular character or sequence of characters identified, when a supported language is identified.

Preferably, formatting spaces in the electronic character sequence comprises inserting and/or deleting spaces in the electronic character sequence.

In a preferred embodiment, the character identifier comprises:
  at least one set of rules, each rule relating to a particular character or sequence of characters to be identified in the electronic character sequence; and
  a comparison mechanism configured to compare each rule of one of the at least one set of rules to the electronic character sequence to identify whether a rule is applicable;
  wherein each rule is associated with one or more actions which describe the format of spaces to be applied by the formatting module to the electronic character sequence given a supported language and the particular character or sequence of characters; and
  wherein the formatting module is configured to format spaces in the electronic character sequence by applying the one or more actions associated with the applicable rule to the electronic character sequence.

The comparison mechanism is preferably configured to compare each rule of one of the at least one set of rules to the electronic character sequence only when a supported language is identified.

Preferably, the formatting module supports a plurality of languages and the language identifier is configured further to identify the most likely language of the supported languages that the electronic character sequence is written in.

The character identifier may be configured to identify a punctuation mark and the formatting module may be configured to format the spaces either side of the punctuation mark on the basis of the punctuation mark.

The character identifier may be configured to identify a particular context in the electronic character sequence and the formatting module may be configured to format the spaces in the electronic character sequence on the basis of the context.

The character identifier may be configured to identify a punctuation mark in the electronic character sequence, and the formatting module may be configured to format the spaces either side of the punctuation mark on the basis of the category of punctuation mark.

The one or more actions may comprise a sequence of actions, wherein when a rule is found to be applicable, the comparison mechanism is configured to apply the sequence of actions to the electronic character sequence.

When the formatting module is configured to support a plurality of languages, the character identifier preferably comprises a plurality of sets of rules, one set of rules for each language that is supported, where the comparison mechanism is configured to compare each rule of the set of rules that corresponds to the most likely language to the electronic character sequence.

The formatting module may comprise sets of rules relating to each language, each family of languages, and all languages in the world, wherein the rules are applied in a hierarchal structure such that, once a supported language has been identified, the comparison mechanism first compares each rule from the set of rules specific to that language, followed by each rule from the set of rules applicable to the family of languages to which that language belongs, followed by each rule of the set of rules which are applicable to all languages until an applicable rule is identified or no applicable rule is identified and all rules are exhausted.

The comparison mechanism is preferably configured to compare the rules in a specific predetermined order. The set of rules preferably comprises context rules, character rules and category rules and the comparison mechanism is preferably configured to compare the rules in the following order until an applicable rule is identified or no applicable rule is identified and all rules are exhausted: context rules, character rules, and then category rules.

In a second aspect of the invention there is provided a formatting module supporting at least one language and configured to format spaces in an electronic character sequence, the formatting module comprising:
 a punctuation mark identifier configured to identify a punctuation mark in the electronic character sequence;
 wherein the formatting module is configured to format spaces in the electronic character sequence on the basis of the language in which the electronic character sequence is written, the punctuation mark identified, and a context of the punctuation mark, when a supported language is identified, In a third aspect of the invention there is provided a system for inputting text into an electronic device comprising:
 a text prediction engine configured to receive an electronic character sequence as input and configured to generate and output a corrected electronic character sequence; and
 a formatting module as described above, wherein the formatting module is configured to receive the modified electronic character sequence as input, and to generate a formatted character sequence by formatting spaces in the modified electronic character sequence when a supported language is identified.

In a fourth aspect of the invention there is provided a system for inputting text into an electronic device comprising:
 a text prediction engine configured to receive an electronic character sequence as input, the text prediction engine comprising:
  a language identifier configured to identify which language the electronic character sequence is most likely written in, and to correct the electronic character sequence on the basis of the identified language;
  wherein the text prediction engine is configured to generate and output a corrected electronic character sequence and to output the language identified;
 a formatting module supporting at least one language and configured to receive the language identified and the corrected electronic character sequence, and configured to format spaces in the electronic character sequence when the identified language is supported, the formatting module comprising:
  a character identifier configured to identify a particular character or a particular sequence of characters in the electronic character sequence;
  wherein, the formatting module is configured to format spaces in the electronic character sequence on the basis of the language identified and the particular character or the particular sequence of characters identified.

In a fifth aspect of the invention there is provided a method of formatting, with a formatting module supporting at least one language and having a character identifier, spaces in an electronic character sequence, the method comprising:
 identifying whether the electronic character sequence is written in a language supported by the formatting module;
 identifying, with the character identifier, a particular character or a particular sequence of characters in the electronic character sequence;
 formatting, with the formatting module, spaces in the electronic character sequence on the basis of the language identified and the particular character or sequence of characters identified, when a supported language is identified.

The formatting module may comprise a language identifier to identify whether the electronic character sequence is written in a language supported by the formatting module. Preferably, the formatting module supports a plurality of languages and the method further comprises identifying with the language identifier the most likely language of the electronic character sequence.

The most likely language of the electronic character sequence may be identified by a text prediction engine, where the method further comprises transmitting the most likely language to the formatting module which identifies whether the most likely language is supported by the formatting module.

The language identifier preferably comprises at least one set of rules and a comparison mechanism, each rule defining the formatting of spaces in the electronic character sequence, wherein the method further comprises:
 comparing, with the comparison mechanism, each rule of one of the at least one set of rules to the electronic character sequence to identify whether a rule is applicable to the character sequence;
 identifying, with the comparison mechanism, that a particular rule is applicable to the character sequence; and
 applying the applicable rule to the electronic character sequence to format the spaces in the electronic character sequence.

Preferably, the comparison mechanism compares each rule of one of the at least one set of rules to the electronic character sequence only when a supported language is identified.

Each rule may relate to a particular character or sequence of characters to be identified and each rule is associated with one or more actions which describe the format of spaces to be applied by the formatting module to the electronic character sequence given a supported language and the particular character or sequence of characters. In the method, the step of applying the applicable rule preferably comprises applying the one or more actions associated with that applicable rule to the electronic character sequence.

Identifying a particular character may comprise identifying a punctuation mark and formatting the spaces in the electronic character sequence may comprise formatting the spaces either side of the punctuation mark on the basis of the form of the punctuation mark.

Identifying a particular sequence of characters may comprise identifying a particular context and formatting the spaces in the electronic character sequence may comprise formatting the spaces on the basis of the context.

Identifying a particular character may comprise identifying a punctuation mark and formatting the spaces in the electronic character sequence may comprise formatting the spaces either side of the punctuation mark on the basis of the category of punctuation mark.

Where each rule is associated with one or more actions, the one or more actions may comprise a sequence of actions, wherein the sequence of actions is applied sequentially to the electronic character sequence.

Where the formatting module supports a plurality of languages, the language identifier may comprise a plurality of sets of rules, one set of rules for each language supported, and comparing each rule to the electronic character sequence comprises comparing each rule of the set of rules that corresponds to the most likely language.

The formatting module may comprise sets of rules relating to each supported language, each family of languages, and all languages in the world, and the method comprises applying the rules in a hierarchal structure such that, once a language has been identified, the comparison mechanism first compares each rule from the set of rules specific to that language, followed by each rule from the set of rules applicable to the family of languages to which that language belongs, followed by each rule of the set of rules which are applicable to all languages until an applicable rule is identified or no applicable rule is identified and all rules are exhausted.

The comparison mechanism preferably compares the rules in a specific predetermined order.

The set of rules may comprise context rules, character rules and category rules, and the method preferably comprises comparing the rules in the following order until an applicable rule is identified or no applicable rule is identified and all rules are exhausted: context rules, character rules, and then category rules.

In a sixth aspect of the invention there is provided a computer program product comprising a computer readable medium having stored thereon computer program means for causing a processor to carry out a method as described above.

BRIEF DESCRIPTION OF THE DRAWINGS

The present invention will now be described in detail with reference to the accompanying drawings, in which.

DETAILED DESCRIPTION

The present invention provides a formatting module that is configured to format the spaces for a particular sentence on the basis of the conventions for the language in which the sentence is written. The formatting module formats the spaces by inserting and/or deleting spaces in the electronic character sequence.

Figure 1:
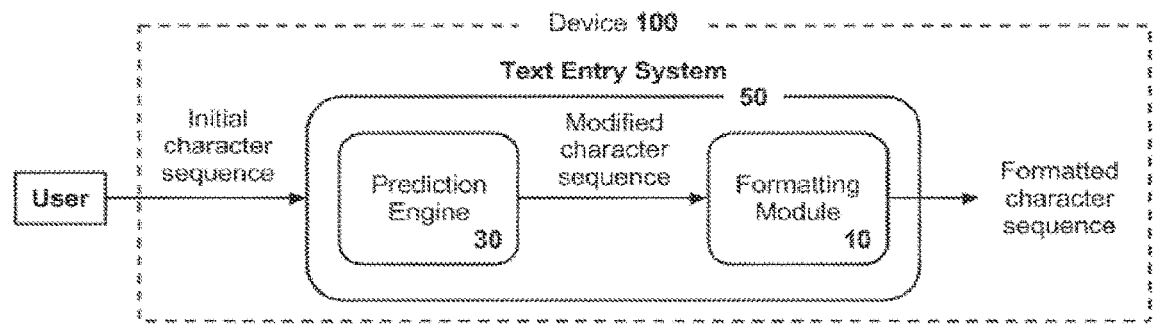
FIG. 1 is a schematic of a system comprising a prediction engine and a formatting module in accordance with the present invention.

Preferably, but not necessarily, the formatting module 10 is part of a system, such as an electronic device 100, comprising a text prediction engine 30, as shown in FIG. 1. The electronic device is preferably a mobile device, such as a PDA, tablet, laptop computer or mobile phone. The formatting module may be used to format the spaces in an electronic character sequence entered by a user for a text message. The user interacts with a text entry system 50 of the electronic device 100 by entering text via an input mechanism such as a virtual keyboard. In the particular case of a predictive text entry system, the text prediction engine 30 may be configured to correct mistyped or misspelt words and may also be configured to predict what the user is going to write next, thus improving the performance and quality of the text input into the device. An example of such a text prediction engine 30 is described in PCT/GB2011/001419, which is hereby incorporated by reference in its entirety.

Figure 2:
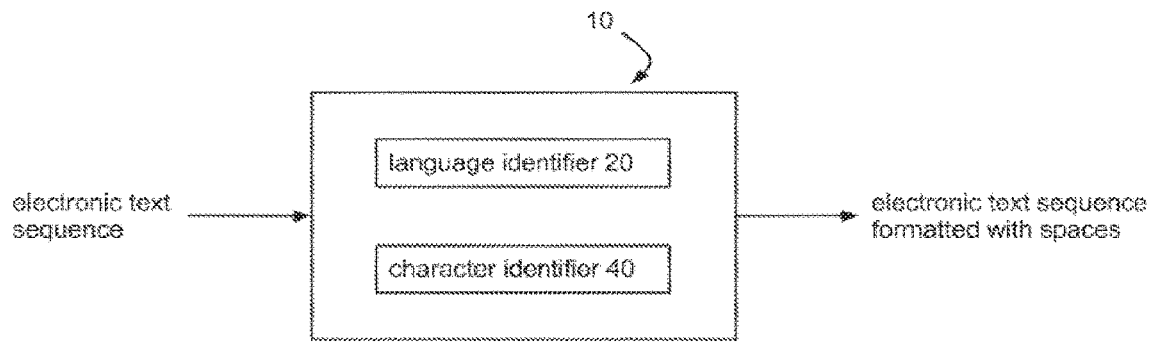
FIG. 2 is a schematic of a formatting module in accordance with the present invention.

As can be seen from FIG. 1, a character sequence is input into the device 100. The character sequence is passed to a text prediction engine 30 which may modify that character sequence to correct misspelt words and/or to predict words. The character sequence, so modified by the text prediction engine 30, is passed to the formatting module 10. The formatting module 10 is configured to output a space formatted version of the modified character sequence, as shown in FIGS. 1 and 2. The formatting module formats the spaces of a character sequence by inserting and/or deleting spaces in the sequence. The formatting module 10 formats the spaces for an electronic character sequence, if the language in which that character sequence is written is supported by the formatting module 10.

A formatting module 10 in accordance with the present invention is shown in FIG. 2. The formatting module 10 is configured to support at least one language. The formatting module 10 comprises a language identifier 20 configured to identify whether an electronic character sequence is written in a language supported by the formatting module 10. The language identifier 20 makes use of one or more statistical language models, the general properties of which are known in the art, in order to identify whether the electronic character sequence is written in a language supported by the formatting module 10.

In a preferred embodiment, the formatting module 10 supports a plurality of languages. Thus, in the preferred embodiment, the language identifier 20 comprises a plurality of statistical languages models, each statistical language model corresponding to a different language supported by the formatting module 10, and the language identifier 20 is configured further to identify the most likely supported language of the electronic character sequence. At any given stage, the formatting module 10 is configured to maintain a list of "active languages", each of which is associated with a language model.

One process for identifying the most likely current language is to maximize the probability of a language, given a context, i.e. maximizing P(language|context), according to the following expression (using Bayes rule):

$$P(\text{language} \mid \text{context}) = \frac{P(\text{context} \mid \text{language})P(\text{language})}{P(\text{context})}$$

As the absolute values of P(language|context) are not important, since only the ranking of languages matters, the term P(context), which does not depend on language, may be dropped from the expression. Additionally, a uniform prior over languages, P(language)=k, may also be dropped since it is constant with respect to language. With these assumptions, the only quantity that the language identifier is required to estimate is P(context|language). Typically context is just a sequence of words, therefore to estimate P(context|language), the language identifier preferably uses a 'chain' of conditional probability estimates, making a 'Markovian' conditional independence assumption:

$$P(\text{language} \mid \text{context}) \approx \prod_{i=0}^{N_{words}} P(\text{word}_i \mid \text{word}_{i-1} \ldots \text{word}_{i-N+1}, \text{language})$$

Each language is therefore separately modelled by a smoothed n-gram language model (known in the art and as described in WO 2012/042217), capable of estimating the probability of a word, given local context.

There are other ways of estimating P(context|language), using different types of language models, e.g. those that include syntactic and/or semantic information. Another possibility would be to use a Hidden Markov Model (HMM) to estimate a progression of unobserved language "states". A further possibility would be to use a supervised discriminative classification model to predict language, e.g. a support vector machine (SVM) or neural network.

To transform the incoming sequence of characters into a sequence of terms the language identifier 20 uses a tokenizer as is known in the art.

In a system such as that illustrated in FIG. 1, the prediction engine 30 may comprise a language identifier, rather than it being provided in the formatting module 10. As described above, the language identifier will comprise a tokeniser and a plurality of language models, which may already be present in the prediction engine, such as the prediction engine described in WO 2012/042217, which is hereby incorporated by reference in its entirety.

To estimate the most likely language given context, the language identifier 20 is configured to calculate the likelihood of the context in each language which is supported in turn, and selects the language with the maximum likelihood. The likelihood of the context (a sequence of terms) is the product of the probability of each term, given preceding terms, which is computed by a smoothed n-gram model, as has been described in relation to a text prediction engine in WO 2012/042217.

If the user switches languages whilst typing, the formatting of the spaces around the punctuation marks may differ between the sentences, dependent on the language in which it is written, e.g. "Bonjour mon ami! How are you doing? Talk to you soon."

To provide a formatting module 10 that is capable of identifying a change in language, for example where a user has switched languages between sentences, the language identifier 20 is preferably configured to limit the amount of context used to make the estimate of the most likely language. This provides a basic form of recency in the model for identifying the most likely language—languages used more recently are intuitively more likely than languages used much earlier in a document. For instance, in one embodiment, the language identifier 20 may use the six most recent words of context. However, the number of most recent words of context could be chosen dependent on the frequency at which a user switches between languages and the length of their input stream in any given language.

The language identifier 20 is preferably configured to identify whether the language in which the electronic character sequence is written is supported by the formatting module 10. By way of a non-limiting example, the language identifier 20 may identify that the electronic character sequence is written in an unsupported language if none of the context terms of the sequence are present in one of the language identifier's language models, where each language model corresponds to a supported language. Thus, if one or more of the context terms are determined to be present in one of the language models, the language identifier determines that the electronic character sequence is written in a supported language. A variation on this example is one in which the language identifier 20 is configured to identify whether a certain fraction or ratio of the context words are present in a language model, e.g. a quarter, two-thirds or any other fraction or ratio of the context terms are present in one of the language models, in order to determine that the electronic character sequence is written in a supported language. Any other suitable method for determining whether the language of the electronic character sequence is supported can be used.

Figure 3:
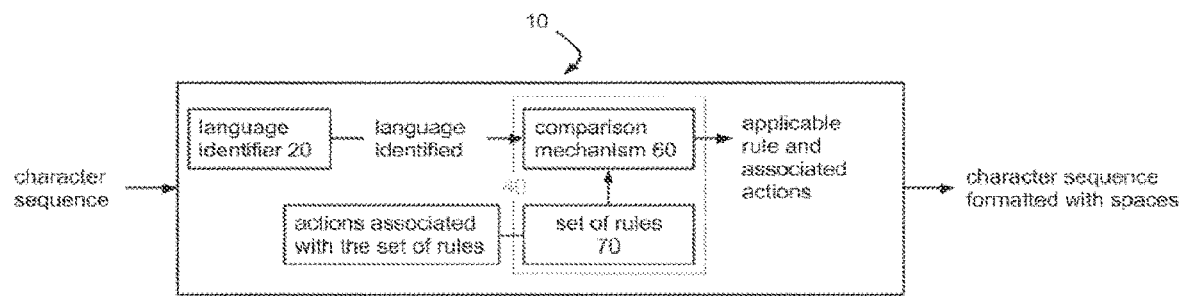
FIG. 3 is a schematic of the formatting module of FIG. 2 shown in greater detail.

As shown in FIG. 3, the character identifier 40 preferably comprises a set of rules 70, each rule relating to a character or particular sequence of characters to be identified, and a comparison mechanism 60 configured to compare each rule of the set of rules 70 to the electronic character sequence to determine whether a rule is applicable. If the rule is applicable, then a character or particular sequence of characters is identified, e.g. if the rule relates to a particular punctuation mark and the rule is found to be applicable, it is because that punctuation mark is within the electronic character sequence. The electronic character sequence is preferably passed to the formatting module 10 sequentially, e.g. a character at a time, with the comparison mechanism 60 comparing each rule to the last character or last sequence of characters received.

Thus, the character identifier 40 uses the rules to identify when a particular character or sequence of characters, such as a punctuation mark, occurs in the electronic character sequence. Furthermore, the rules define, by one or more actions associated with the rule, the space formatting to apply to the electronic character sequence. i.e. whether spaces should be inserted and/or deleted. Thus, once a rule has been found to be applicable to a particular character or sequence of characters, the actions associated with that rule are applied to the electronic character sequence to format the spaces within the electronic character sequence, e.g. in the case of the particular character being a punctuation mark, the actions may define the formatting of the spaces either side of the punctuation mark, as will be described in more detail below.

The set of rules 70 preferably comprises a plurality of sets of rules, a set of rules for each language supported by the formatting module 10. The comparison mechanism 60 is configured to compare the set of rules relating to the language identified by the language identifier 2 as the most likely supported language. In an embodiment in which the language identifier 20 supports a single language, the comparison mechanism 60 comprises a single set of rules 70 corresponding to that language, and the comparison mechanism 60 is configured to compare the set of rules 70 to the electronic character sequence if the language of the character sequence is identified as being the supported language. If the language of the character sequence is not identified as a supported language, the comparison mechanism 60 does not search for applicable rules.

The formatting module 10 is configured such that a system designer is able to manually add new rules, with associated actions, to the formatting module. The rules and associated actions can be updated without affecting the other components of the formatting module.

A rule is preferably defined by a four-tuple, as follows:
Rule::(C,s,A,S)

:: is an operator that can be read "has type of".

C is a condition taking the form of a regular expression, implementing a function of type F::[character]→{true, false}, e.g. taking the incoming character sequence and returning a boolean denoting whether or not a rule is applicable and thus whether or not to apply the sequence of actions associated with that rule. The comparison mechanism 60 identifies a particular character or sequence of characters in an electronic character sequence by implementing the function of the type F::[character]→{true, false}. This field is therefore essential and is never empty.

s represents a state that allows the system to "remember" previous rule applications in some cases. For example, the state may be "None" when the system is not required to maintain a status, or the state may be "Open" or "Close" where punctuators appear in pairs and one cannot exist without the other, e.g. left parenthesis '(' and right parenthesis ')'.

A is a sequence of Actions, i.e. A::[Action]. In special cases this could be an empty sequence represented by [ ]. Actions are the means by which the formatting module 10 describes the space formatting that should be applied to, for example, a punctuation mark given a particular character sequence context (e.g. where the punctuation mark is found in the context of a mathematical equation). When a punctuation mark of the electronic character sequence is determined by the comparison mechanism 60 to match one of the rules, each action held by the rule is applied, preferably sequentially, to the punctuation mark to ensure the correct formatting of the spaces either side of the punctuation mark. For example, if the punctuation mark is a full stop, the Action might be to delete the space before the full stop (if such a space is present) and to insert a space after the full stop (if such a space is missing), where the most likely language is English.

There are two types of actions that the formatting module may comprise: type A and type B.

An action of type A is a function that operates on a sequence of characters and returns a formatted sequence of characters, without changing the sequence of characters, other than by formatting them:

Action A::[character]→[character]

For example, in the case of "word.word"→"word. word"

An action of type B is a function that given a sequence of characters returns a code that represents the state of the system, without changing the sequence of characters:

Action B::[character]→new state

The new state is any of the possible states that the system might be in, e.g. the shift state to define whether the next character should be capitalised or not, e.g. "Word."→"shift state of system".

S is a recursive sequence of rules, known as "secondary rules", i.e. S::[Rule]. When the Rule does not describe any secondary rules, S will be represented by Ø. The secondary rules will be checked before the actions of the parent rules are applied, allowing an alternative behaviour for condition C depending on factors described by the secondary rules. The input for the secondary rules is the same electronic character sequence as for the parent rules; however, the focus of the condition C for the secondary rule is the character in the sequence that precedes the character that triggered the parent rule.

For example, in the preferred embodiment where the electronic character sequence is passed to the formatting module sequentially, e.g. a character at a time, the comparison mechanism compares each parent rule to the last character received. If a parent rule is found to be applicable, and that parent rule comprises at least one secondary rule, the comparison mechanism compares the at least one secondary rule to the penultimate character in the sequence (since the condition C for the parent rule is focused on the final character, whereas for the secondary rule the focus is on the penultimate character).

The application of secondary rules will be described in more detail below. Since secondary rules are not essential, the general form of the Rule could omit this field.

When designing the formatting module 10, the sequence of actions associated with a rule can be selected by a designer from a predetermined set of candidate actions. The sequence of actions may contain any number of the candidate actions in any order and with any number of repetitions. As stated above, the formatting module 10 allows a system designer of the formatting module 10, to manually extend and adapt the associated actions to the requirements of the languages or the text entry system.

In a preferred embodiment, the formatting module comprises three specialisations of the Rule described above: Context Rules, Category Rules, and Character Rules. The specialised rules provide a powerful tool to capture the way punctuation is used in natural language.

A context rule is a rule of the form: Context Rule::(C, None,A,Ø). The regular expression present in C is applied only to the context, e.g. the regular expression corresponds to a particular character sequence in the context of the electronic character sequence, for example "www". Since the state is "None", a Context Rule will never have or maintain state. The Context Rules have no "secondary rules".

An example of a context rule is a rule for URLs which states that when "www" is in the context, no spaces should be inserted automatically on either site of the punctuator ".", e.g. "www.site.com"

Thus, an example of a context rule is:

Context Rule::('www',None,[DeleteSpaceBefore, DeleteSpaceAfter],Ø).

A Category Rule preferably takes the form: Category Rule::(C,None,A,S) This rule will match the Unicode category of the character in the electronic character sequence to the Unicode category defined by the rule, e.g. the Unicode category of a punctuation mark.

C is a regular expression that is limited to matching the Unicode category of the punctuation mark. Therefore, this type of Ru/e is only applied to a single character. S is a sequence of secondary rules, e.g. a context rule, a character rule or a category rule. Alternatively this field can be empty, Ø, in the case where no secondary rules are defined.

An example of a category rule is:

Category Rule::('P',None,[DeleteSpaceBefore,InsertSpaceAfter],∅) where P corresponds to a category of punctuation marks, e.g. a category that includes '!' and '?' because they should be formatted with the same spaces.

As is known in the art, characters within the Unicode standard have a range of properties associated with them. One of these properties is the category to which a character belongs. The condition C of a category rule can relate to a Unicode category. The General Category value for a character serves as a basic classification of that character, based on its primary usage. The property extends the widely used subdivision of ASCII characters into letters, digits, punctuation, and symbols—a useful classification that needs to be elaborated and further subdivided to remain appropriate for the larger and more comprehensive scope of the Unicode standard.

Each Unicode code point is assigned a normative General Category value. Each value of the General Category is given a two-letter property value alias, where the first letter gives information about a major class and the second letter designates a subclass of that major class. In each class, the subclass "other" merely collects the remaining characters of the major class. For example, the subclass "No" (Number, other) includes all characters of the Number class that are not a decimal digit or letter. These characters may have little in common besides their membership in the same major class.

A character rule preferably takes the form: Character Rule (C,s,A,S). This rule matches a character defined by the rule to a character in the electronic character sequence. Therefore, in this type of rule, C can only contain a single character. C is a regular expression consisting of a single character matched against a character of the electronic character sequence. C may define the Unicode for the particular character of interest, this Unicode being matched to the Unicode in the electronic character sequence.

s preferably defines two new states, in addition to the None state: {Open, Close, None}. s therefore dictates actions for ambiguous pairs that might be in an Open or Close state, and also includes no state for non-ambiguous characters. By this definition, if for one punctuation mark two different sequences of Actions are required for different states, the system will define two rules. e.g. for the English language to format the following sentence correctly:

And he said "Goodbye" and left. It was surprising.

The character rules that define the formatting of spaces in this sentence are as follows:

rule1→Character Rule::('"',Open,[InsertSpaceBefore, DeleteSpaceAfter],∅)

rule2→Character Rule::('"',Close,[DeleteSpaceBefore, InsertSpaceAfter],∅)

rule3→Character Rule::('.',None,[DeleteSpaceBefore, InsertSpaceAfter],∅)

S is a sequence of secondary rules, which may include any of the three types of rules: Context. Category or Character. It can also define no further rules, in which case this field is denoted by ∅.

An example to explain the interaction of the rules and, in particular, how secondary rules are applied is now provided. In French, a space is placed either side of an exclamation mark "!" or a question mark "?", e.g. Bonjour ! Ça va?. However, there is an exception to this rule, when another exclamation mark precedes the current one, e.g. Bonjour !!! Ça va?. In order for the system to deal with this situation properly secondary rules can be defined:

rule1→Character Rule::('!',None,[InsertSpaceBefore, InsertSpaceAfter],[rule2])

rule2→Category Rule::('P',None,[DeleteSpaceBefore,InsertSpaceAfter],∅)

In this example, P relates to Category punctuation in accordance with the Unicode standard which occurs prior to the current character of interest e.g. if the formatting module 10 receives "!" in the sequence "?!". P is the category that encompasses "?". In the example above, when the user types the first '!' rule1 will be triggered. Within the trigger routine of rule1 all the secondary rules will be checked but no matches will happen, since there is no punctuation mark preceding the '!', so the default actions for rule1 will be applied by the formatting module 10. On subsequent insertions of the exclamation mark, the step for matching secondary rules will trigger rule2 as '!' is within the Category Punctuation by the Unicode standard and the actions defined in rule2 will be applied.

The outcome if rule2 did not exist the formatting would be: Bonjour ! ! ! Ça va? Thus, resulting in an incorrect formatting of the text.

For a given language it is generally required to have multiple rules defined to ensure correct formatting of spaces in an electronic character sequence. The different types of rules, i.e. context, category and character, are preferably applied using a priority scheme, such that the formatting module 10 can succinctly specify the formatting patters of the spaces for a given language.

A couple of examples which demonstrate why it is preferable to prioritise the application of the types of rules are provided below.

For the specific case of URLs, assume that there are two rules: a context rule which defines that when "www" is in the context, no space should be inserted automatically; and a character rule that says that when the full stop "." punctuation mark is introduced, a space should be inserted afterwards. In this situation, if the character rule is applied first and the user enters "www.site.com", the result from the punctuator will be "www. site. com", because the character rule for the full stop will have preference. To format such a URL correctly, the context rule should have preference over the character rule and should therefore be applied first.

In another example, where a formatting module comprises two rules: a first category rule that states that all the characters in a Maths category will have spaces on either side of the Maths character, and a second character rule that defines that the character "-" (minus) will not have any spaces either side of it, because it is most likely to be used as a hyphen. If the user were to insert '-', and the category rule was prioritised over the character rule, the character rule would never be triggered. Thus, to format the sequence correctly, the character rule should be prioritised over the category rule.

The rule that is prioritised is applied, and the comparison mechanism 60 stops the search for applicable rules. However, as described above, a different rule type may be applied as part of a secondary set of rules.

Figure 4:
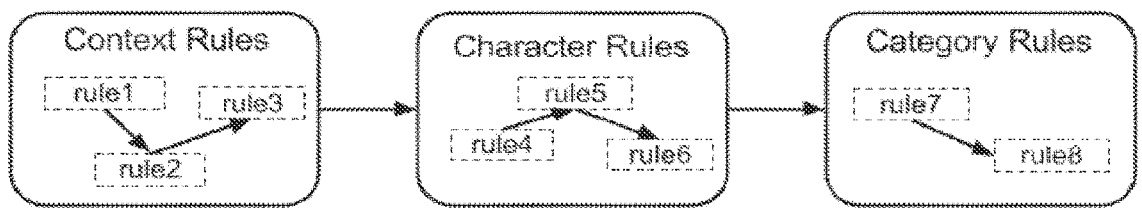
FIG. 4 is an illustration of a structure of specific types of rules within a set of rules for a given language, and shows the order in which a comparison mechanism compares the rules, in accordance with the present invention.

Thus, in the preferred embodiment, as illustrated in FIG. 4, the comparison mechanism is configured to compare, and the formatting module is configured to apply, the rules for an individual language in accordance with the following prioritisation structure:

Context Rules→Character Rules→Category Rules

To implement the prioritisation structure, the comparison mechanism 60 is preferably configured to identify the type of rule. The comparison mechanism 60 can be configured to identify the rule type by any suitable means. For example, each rule can be labelled with its rule type, where the comparison mechanism 60 is configured to identify all of the rules of a first rule type before comparing those rules to the electronic character sequence to see if one of them is applicable. The rules of a given type can be placed in a container, so that the comparison mechanism 60 compares all rules in a given container, before moving on to the next container. In another embodiment, the comparison mechanism 60 may comprise code to identify the different rule types.

Alternatively, the rules themselves could be ordered according to the prioritisation structure, e.g. listed in accordance with the prioritisation structure.

As will be apparent from the description above, if the comparison mechanism 60 finds that a rule is applicable, it does not continue through the prioritisation structure, e.g. if the category rule is found to be applicable to www.site.com, then the character rule is not compared or applied, since the comparison mechanism 60 has stopped searching for applicable rules. Otherwise this character rule, if applied after the context rule, would result in the incorrect formatting "www.Site.Com" as described above. However, the rule that is applied may comprise secondary rules of the other rule types, e.g. the formatting module dealing with repeated punctuation '!!', where the triggered character rule comprises a secondary category rule:

rule1→Character Rule::('!',None,[InsertSpaceBefore,
       InsertSpaceAfter],[Rule2])

rule2→Category Rule::('P*',None,[DeleteSpaceBe-
       fore,InsertSpaceAfter],Ø)

Rules may be applicable to a particular language, e.g. English, and the family of languages to which that language belongs, e.g. Latin, or to all languages in the world. There are multiple conventions for punctuation that are common to a number of languages. For example, in all languages URLs are written the same way and therefore they all must have the necessary rules for the correct formatting of these elements.

In the preferred embodiment in which the formatting module 10 supports a plurality of languages, the language identifier 20 is configured to pass the identified language to the comparison mechanism 60, and the comparison mechanism 60 is configured to compare the rules from the set of rules 70 that are relevant given the particular language so identified. The set of rules is preferably ordered into a hierarchal structure, in order to avoid repeating the same rules.

Thus, in addition to the comparison mechanism 60 being configured to compare the rules according to the rule prioritisation structure, e.g. context rule→character rule→category rule, as described above, the comparison mechanism 60 is further configured to compare the rules in a particular order of increasing generality:

language specific rules→language family rules-
       →worldwide rules

To enable the comparison mechanism 60 to compare the rules in this order, the comparison mechanism is preferably configured to identify the language generalisation rule i.e. whether the rule is a language specific rule, a language family rule or a worldwide rule. The comparison mechanism 80 may be coded to recognise the language generalisation rule or each rule may be labelled to identify the type of language generalisation rule, and containers may be used, as explained above when discussing the rule type prioritisation structure. As stated above, an alternative could be to order the rules into the generalisation structure.

Thus, the comparison mechanism 60 is preferably configured to identify the rule type and the language generalisation rule, e.g. context rule applicable to French (language specific rule).

Figure 5:
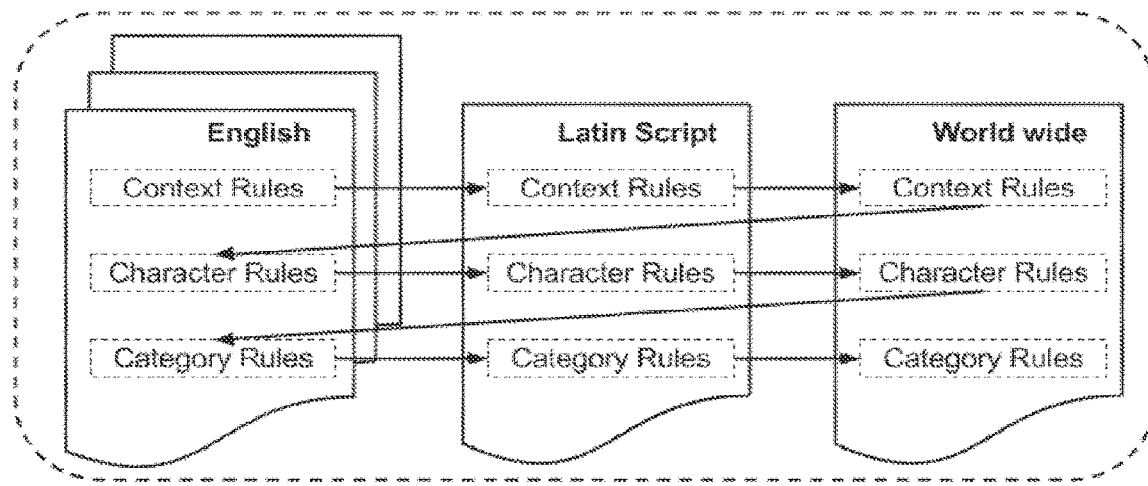
FIG. 5 is an illustration of how the rules are structured for the English language and the order in which the comparison mechanism compares the rules, in accordance with the present invention.

As can be seen from FIG. 5, the comparison mechanism 60 compares the rules in accordance with the priority system described above, until a rule is found to be applicable: first all the "context rules" will be compared in order of increasing generality of language, e.g. the context rules are checked first for language specific rules, then for family rules, and then for worldwide rules; the comparison mechanism 60 then proceeds to compare the next type of rule, character rules, through increasing generality in language, and then compares the category rules in the same way, until a rule is found to be applicable, at which point the comparison mechanism 60 stops the search for an applicable rule. Alternatively, the comparison mechanism 60 compares all of the rules to find that no rule is applicable and all rules are exhausted.

Preferably, the comparison mechanism 60 is configured to compare each of the rules to each character in the electronic character sequence in turn. Thus, if the comparison mechanism 60 discovers that a rule is applicable to a character of the character sequence, the formatting module 10 applies this rule to the electronic character sequence to format the spaces of the electronic character sequence, and the comparison mechanism moves on to comparing the rules to the next character in the character sequence. Likewise, if no rule is found to be applicable to that character, the comparison mechanism 60 moves on to comparing the rules to the next character in the electronic character sequence.

As will be understood from above, the language identifier 20 is configured to identify whether the language in which the electronic character sequence is being written is supported and, preferably, which is the most likely supported language. The language identifier 20 may be configured to identify the current language periodically, e.g. for every term (where the electronic character sequence is converted into a sequence of terms or words by a tokeniser) or for example every three terms, in order to identify whether the language has been switched by the user and thus to change the set of rules that are being compared by the comparison mechanism 60 to the electronic character sequence. Any other frequency of checking may be used. If the language identifier 20 determines that the language of the character sequence is not supported by the formatting module 10, the comparison mechanism 60 stops searching for an applicable rule.

A formatting module 10 or system 100 comprising a formatting module 10 in accordance with the present invention provides language detection and rule mechanisms that provide automatic dynamic punctuation. Unlike existing systems which neglect the possibility of having different behaviours for the same punctuation mark depending on the context in which the punctuation mark occurs, the formatting module 10 of the present invention is able to format the spaces either side of a punctuation mark on the basis of the context of the punctuation mark.

The formatting module 10 of the present invention is therefore able to increase the productivity of the user by reducing the interaction required to produce correctly formatted punctuation appropriate to the target language. For multilingual users, the formatting module 10 is preferably able to automatically adjust the space formatting to the language currently being entered. This allows the user to focus on the message being delivered rather than formatting conventions specific to various target languages.

Furthermore, the formatting module 10 of the present invention provides a separate layer that defines the behaviour of the formatting of the spaces for the punctuation, i.e. the rules and their associated actions. This allows independent manual updates of the rules and their associated actions for a particular language, to change the space formatting for that language, without affecting the space formatting for the other languages or requiring an upgrade of the entire formatting module 10.

The present invention also provides a corresponding method for formatting spaces in an electronic character sequence that has preferably been entered by a user. Turning to FIG. 1 and the above described formatting module 10 and system 100 comprising a formatting module 10, the method comprises identifying whether the electronic character sequence is written in a language supported by the formatting module; identifying, with the character identifier 40 (see FIG. 2), a particular character or a particular sequence of characters in the electronic character sequence; and formatting, with the formatting module 10 if a supported language is identified, spaces in the electronic character sequence on the basis of the language identified and the particular character or sequence of characters identified. As will be apparent from the description of the formatting module 10 and the system 100 comprising a formatting module 10, the formatting module preferably supports a plurality of languages, and the most likely supported language can be identified by a language identifier 20 of the formatting module 10 or a language identifier of the prediction engine 30 of the system 100.

Other aspects of the method of the present invention can be readily determined by analogy to the above system description. For example, the formatting module comprises a language identifier to identify whether the electronic character sequence is written in a language supported by the formatting module and to identify the most likely language of the electronic character sequence. The method, by analogy to the formatting module, will also comprise selecting, with a comparison mechanism 10, the set of rules that correspond to the most likely language identified, etc.

The present invention also provides a computer program product comprising a computer readable medium having stored thereon computer program means for causing a processor to carry out the method according to the present invention.

The computer program product may be a data carrier having stored thereon computer program means for causing a processor external to the data carrier, i.e. a processor of an electronic device, to carry out the method according to the present invention. The computer program product may also be available for download, for example from a data carrier or from a supplier over the internet or other available network, e.g. downloaded as an app onto a mobile device (such as a mobile phone) or downloaded onto a computer, the mobile device or computer comprising a processor for executing the computer program means once downloaded.

It will be appreciated that this description is by way of example only; alterations and modifications may be made to the described embodiment without departing from the scope of the invention as defined in the claims.

The invention claimed is:

1. A system comprising:
    a processor;
    memory storing instructions that, when executed by the processor, configure the system to:
    identify one or more context terms in an electronic character sequence including one or more individual characters, wherein the one or more context terms as a whole indicate a language;
    determine the language used in the electronic character sequence based on the one or more context terms;
    select a formatting rule set associated with the language from a set of language formatting rules of a group of rule sets;
    apply the formatting rule set to the electronic character sequence according to a hierarchical structure of the group of rule sets by first comparing each rule from a set of rules specific to that language, followed by each rule from a set of rules that is applicable to a family of languages to which that language belongs, followed by each rule of the set of rules which are applicable to all languages until an applicable rule is identified or no applicable rule is identified and all rules are exhausted; and
    reformat one or more of the individual characters in the electronic character sequence by adding or removing a space between two of the one or more of the individual characters according to the formatting rule set, wherein the formatting rule set based on the one or more context terms is prioritized over the formatting rule set based on characters and wherein the electronic character sequence is reformatted to comply with the language usage in accordance with the language and the one or more context terms.

2. The system of claim 1, wherein the formatting rule set includes instructions to format a character of the one or more individual characters with spaces in the electronic character sequence.

3. The system of claim 2, wherein the formatting rule set includes instructions to format characters with spaces in the electronic character sequence by adding or deleting one or more space adjacent individual characters.

4. The system of claim 1, wherein the formatting rule set includes instructions to add or remove punctuation adjacent individual characters.

5. The system of claim 4, wherein the punctuation includes an exclamation point, a period, a comma, a semicolon, a colon, quotation marks, a dash, a slash, an apostrophe, or combinations thereof.

6. The system of claim 1, wherein the instructions further configure the system to generate a corrected electronic character sequence.

7. The system of claim 1, wherein the instructions further configure the system to generate a formatted electronic character sequence.

8. The system of claim 1, wherein the one or more context terms comprise one or more specific character sequences indicative of the language.

9. The system of claim 1, wherein the one or more context terms comprise at least one specific language identifier.

10. The system of claim 1, wherein the formatting rule set comprises a plurality of formatting rules.

11. The system of claim 10 wherein the plurality of formatting rules are to be applied in a specific predetermined order.

12. The system of claim 10, wherein the plurality of formatting rules include context rules, character rules, and category rules.

13. The system of claim 12, wherein the instructions cause the processor is to first apply context rules, then apply character rules, then apply category rules.

14. The system of claim 12, wherein the instructions cause the processor to sequentially compare each individual character of the electronic character sequence to each of the plurality of formatting rules.

15. The system of claim 12, wherein the instructions cause the processor to sequentially compare the electronic character sequence holistically to each of the plurality of formatting rules.

16. The system of claim 1, further comprising a keyboard application for inputting the electronic character sequence.

17. The system of claim 16, wherein the keyboard application comprises a touch screen.

18. The system of claim 1, further comprising a keyboard for inputting the electronic character sequence.

* * * * *